US006371857B1

(12) United States Patent
Kono et al.

(10) Patent No.: US 6,371,857 B1
(45) Date of Patent: Apr. 16, 2002

(54) TORSIONAL VIBRATION DAMPERS

(75) Inventors: Satoshi Kono; Daisuke Shibata, both of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/492,006

(22) Filed: Jan. 27, 2000

(30) Foreign Application Priority Data

Jan. 25, 1999 (JP) .......................................... 11-015444

(51) Int. Cl.[7] ................................................ F16D 3/12
(52) U.S. Cl. ............................. 464/68; 464/67; 464/66; 192/212
(58) Field of Search ............................. 464/68, 66, 67; 192/212, 214.1

(56) References Cited

U.S. PATENT DOCUMENTS

| | | |
|---|---|---|
| 2,251,128 A | 7/1941 | Goodwin |
| 4,530,673 A | 7/1985 | Lamarche |
| 4,722,715 A * | 2/1988 | Billet et al. .................... 464/67 |
| 4,838,395 A * | 6/1989 | Chasseguet et al. .......... 464/66 |
| 4,884,996 A | 12/1989 | Schmitt et al. |
| 5,009,301 A | 4/1991 | Spitler |
| 5,092,820 A | 3/1992 | Naudin et al. |
| 5,218,884 A * | 6/1993 | Rohrle ........................ 74/574 |
| 5,655,635 A | 8/1997 | Yuergens et al. |
| 5,667,053 A * | 9/1997 | Rohrle et al. ............ 192/214.1 |

FOREIGN PATENT DOCUMENTS

| | | |
|---|---|---|
| DE | 40 30 285 | 4/1991 |
| DE | 40 35 320 | 5/1991 |
| DE | 44 34 231 | 3/1995 |
| FR | 2 605 370 | 4/1988 |
| GB | 2 066 416 | 7/1981 |

* cited by examiner

Primary Examiner—Lynne H. Browne
Assistant Examiner—Aaron Dunwoody
(74) Attorney, Agent, or Firm—Foley & Lardner

(57) ABSTRACT

A torsional vibration damper assembly having stable torsional vibration damping characteristics is provided. The damper assembly comprises an input element, an output element, a damper hub operatively connected to the output element and having a plurality of circumferentially spaced, radial hub arms, a drive plate operatively connected to the input element and having a plurality of circumferentially spaced windows, a plurality of compression springs extending between circumferentially opposed edges of the windows and the hub arms, and a ring member rotatable relative to the input and output elements and surrounding the compression springs for restricting radially outward bending of the compression springs. Since the ring member is not urged against its surrounding constituent parts of the damper assembly when it is subjected to a centrifugal force of itself and a centrifugal force of the compression springs, the damper assembly can provide stable torsional vibration damping characteristics.

26 Claims, 6 Drawing Sheets

TORSIONAL VIBRATION DAMPERS

BACKGROUND OF THE INVENTION

1. Field of the Invention

The present invention relate in general to torque transmitting devices, and more particularly to torsional vibration dampers of the kind suited for use with internal combustion engines.

2. Description of the Related Art

An example of this kind of torsional vibration damper assembly in disclosed in U.S. Pat. No. 4,530,673. The vibration damper assembly includes a housing serving as an input element and having drive straps, a hub on which the housing is journaled, the hub having two circumferentially spaced radial hub arms, a compression spring received within the housing and extending between the edges of adjacent hub arms and drive straps, and wedge-shaped dividers inserted between adjacent coils of the spring.

The dividers are provided for dividing the spring into several functioning spring segments, whereby to provide the vibration damper assembly with high deflection amplitude characteristics.

The dividers are adapted to be guided by the housing by being brought into contact at outer arcuated support surfaces thereof with the inside surface of the housing.

SUMMARY OF THE INVENTION

In operation, the dividers are urged against the housing by the centrifugal force of itself and the centrifugal force of the compression springs. Thus, when the dividers are caused to slide within the housing while being guided by same, there is a possibility that a large hysteresis in the torsional vibration damping action is caused, thus disabling to provide stable torsional vibration damping characteristics.

An object of the present invention is to provide a torsional vibration damper assembly which is free from the above described hysteresis in the torsional action or torsional vibration damping action and has stable torsional vibration damping characteristics.

To achieve the above object, there is provided according to an aspect of the present invention a torsional vibration damper assembly comprising a pair of first and second torque transmitting elements rotatable relative to each other, a damper hub operatively connected to the first torque transmitting element and having a plurality of circumferentially spaced radial hub arms, a plurality of compression springs disposed between the second torque transmitting element and the hubs arms, and a ring member surrounding the compression springs and having an inner circumferential side capable of contacting radially outer peripheries of the compression springs.

According to another aspect of the present invention, there is provided a torsional vibration damper assembly comprising a pair of first and second torque transmitting elements rotatable relative to each other, a damper hub operatively connected to the first torque transmitting element and having a plurality of circumferentially equally spaced radial hub arms, a drive plate operatively connected to the second torque transmitting element and having a plurality of circumferentially equally spaced windows, a plurality of compression springs extending between circumferentially opposed edges of the windows and the hub arms, and a ring member rotatable relative to the first and second torque transmitting elements and surrounding the compression springs for restricting radially outward bending of the compression springs.

DESCRIPTION OF THE PREFERRED EMBODIMENTS

Figure 1:
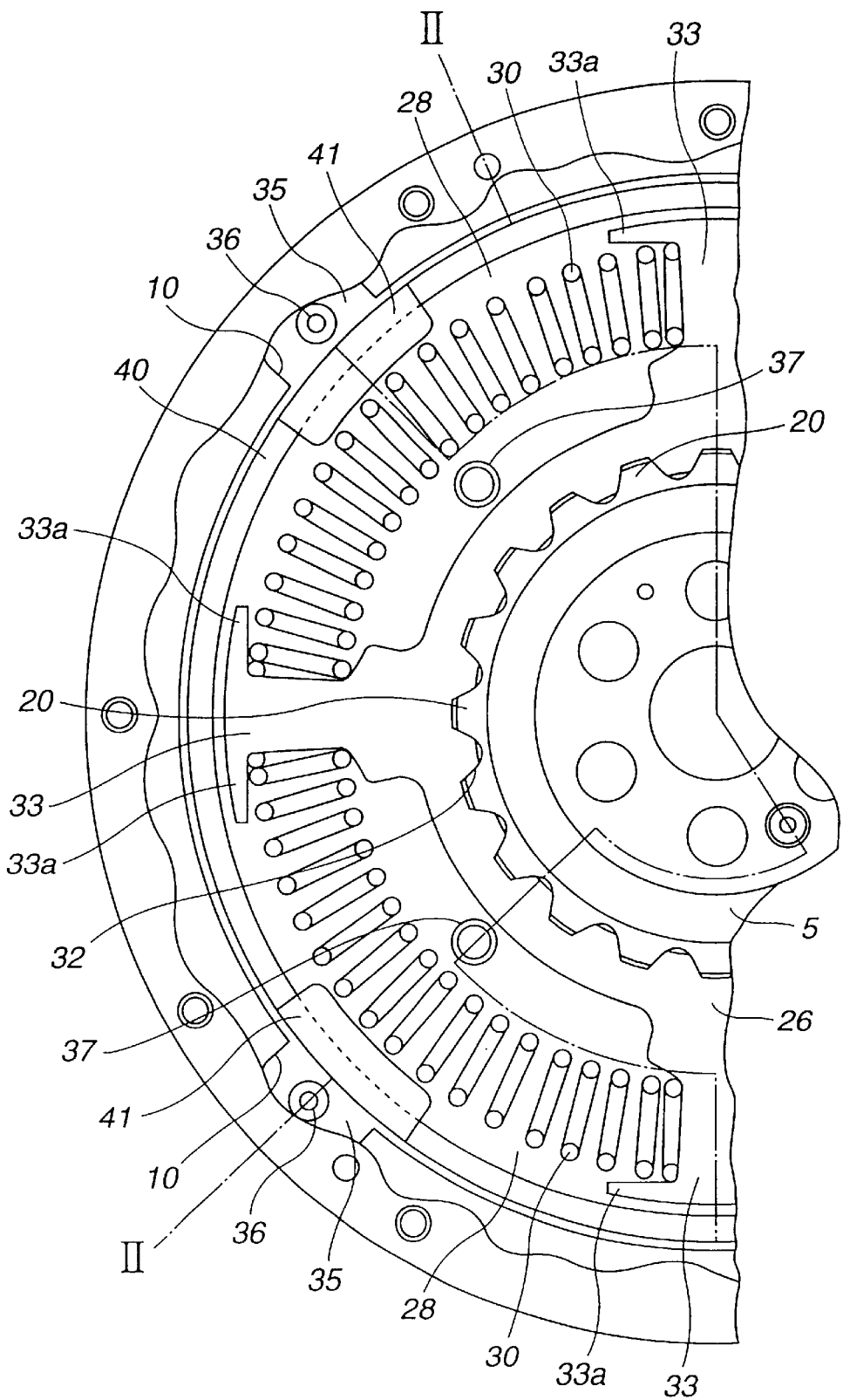
FIG. 1 is a plan, partially cutaway, view of a torsional vibration damper assembly according to an embodiment of the present invention.

Referring more particularly to the disclosure in the drawings wherein are shown illustrative embodiments of the present invention. FIGS. 1 to 3A–3B disclose a torsional vibration damper assembly adapted to constitute a flywheel of an internal combustion engine, i.e., adapted to be operatively connected to a crank shaft 1. The vibration damper assembly includes a first inertia member 2 serving as an input element. The first inertia member 2 is connected with bolts 4 to the crank shaft 1 together with a bearing holder 3. A second inertia member 5 is supported rotatable relative to the first inertia member 2 and adapted to be connected to a clutch assembly (not shown). The vibration damper assembly includes a torsional vibration damper 6 connecting between the first inertia member 2 and the second inertia member 5.

The first inertia member 2 is formed with through holes 7 and further with, on the side facing the second inertia member 5, concentric and continuous annular depression 8 and groove 9. At the outer circumferential edge of the groove 8, there are provided a plurality of notches 10, i.e., four in this embodiment, which are arranged at equal circumferential intervals.

The open ends of the notches 10, which are located on the second inertia member side 5 of the first inertial member 2, is closed by an annular inertia member 11 which is fixedly attached to the second inertia member 5 side of the first inertia member 2. The notches 10 are thus adapted to open only radially inward. The annular groove 9 is located closer to the center of the first inertia member 2 than the depression 8. At the outer circumferential edge of the groove 9, there is formed a notch 12. A ring gear 13 is mounted on the first inertia member 2 and fixedly attached to same.

The second inertia member 5 includes a hub portion 15 and an annular plate portion 16 extending radially outward from the hub portion 15. At the hub portion 15, the second inertia member 5 is supported on the bearing holder 3 by way of a bearing 17 so as to be rotatable thereon. In this connection, since the bearing holder 3 and the first inertia member 2 are connected with bolts 4 to the crank shaft 1 as an integral unit, the second inertia member 5 is resultantly supported on the first inertia member 2 in a way as to be rotatable relative to the first inertia member 2.

The hub portion 15 of the second inertia member 5 has an axial end section protruding into the annular groove 9. The axial end section is formed with a plurality of axial projections 18 which are arranged in a circumferential array with equal intervals. By adjacent axial projections 18 there are formed engagement grooves 19. Further, at the outer circumferential periphery of the hub portion 15, there are formed external teeth 20.

The annular plate portion 16 of the second inertia member 5 has a surface 21 which is to be contacted by a clutch disc of a clutch assembly (not shown).

The torsional vibration damper 6 connecting between the first and second inertia members 2 and 5 is disposed so as to associate with the depression 8 of the first inertia member 2. The damper 6 includes a damper hub 26, a pair of drive plates 27 disposed on the opposite sides of the damper hub 26, and compression springs 30 disposed in respective windows 28 and 29 formed in the corresponding portions of the damper hub 26 and the drive plates 27. The compression springs 30 resiliently connect between the damper hub 26 and the drive plates 27 in a way as to allow them to be rotatable relative to each other.

The damper hub 26 includes a central body portion in the formed of an annular plate. At the inner circumferential periphery of the central body portion, the damper hub 26 has a plurality of internal teeth 32 meshed with the external teeth 20 of the second inertia member 5. By this, the damper hub 26 is not rotatable but axially movable relative to the second inertia member 5. Further, the damper hub 26 has a plurality of circumferentially equally spaced radial hub arms 33 extending radially outward from the central body portion. The above described windows 28 are defined by circumferentially opposed edges of adjacent hub arms 33.

At the radially outer ends of the hub arms 33, there are formed circumferentially extended finger portions 33a for preventing the compression springs 30 from slipping off or moving out of place.

The pair of drive plates 27 are formed with windows 29 corresponding in position to the windows 28 of the damper hub 26. That is, each window 29 of the drive plates 27 has circumferentially opposed edges corresponding in position to the edges of adjacent radial hub arms 33. The compression springs 30 extend between the circumferentially opposed edges of the windows 29 and the hub arms 33 and thereby resiliently connect between the damper hub 26 and the drive plates 27. The drive plates 27 are further formed with, at the outer circumferential peripheries thereof, a plurality of radially outward projections 35 fitted in the notches 10 of the first inertia member 2. At the radially inner and outer ends of the windows 29, there are formed axially outward fingers 29a and 29b which are formed by cutting and bending, so that the compression springs 30 are held between the fingers 29a and 29b and thereby being prevented from slipping off or moving out of place.

The drive plates 27 are joined together by dowel pins 36 and rivets 37 and constitute an integral unit. The rivets 37 are also held fast in the through holes 7, whereby to connect the drive plates 27 to the first inertia member 2. Thus, the drive plates 27 are connected to the first inertia member 2 by two connecting means, i.e., by means of the projections 35 fitted in the notches 10 and by means of the rivets 37. That is, the drive plates 27 are connected at the radially inner side with the rivets 37 and at the radially outer side with the projections 35, to the first inertia member 2.

As best shown in FIG. 1, the compression springs 30 are bowed or arcuated and disposed within the windows 28 of the damper hub 26 and the corresponding windows 29 of the drive plates 27.

In this connection, the windows 28 of the damper hub 26 are defined by the hub arms 33, and the windows 29 are formed in the drive plates 27. Thus, the compression springs 30 resiliently or elastically connect between the damper hub 26 and the drive plates 27 in a way as to allow them to be rotatable relative to each other. The damper hub 26 is connected to the second inertia member (output element) 5, and the drive plates 27 are connected to the first inertia member (input element) 2 and the second inertia member (output element) 5 are connected so as to be rotatable relative to each other.

A ring member 40 in the form of an annular plate is disposed radially outside the compression springs 30 so as to surround the same.

The ring member 40 is constructed and arranged so as to be rotatable relative to the damper hub 26 and the drive plates 27, i.e., the first inertia member 2 and the second inertia member 5 and capable of contacting, at the inner circumferential side thereof, the radially outer peripheries of the compression springs 30. It is selected that the inner circumferential side of the ring member 40 contact the radially outer peripheries of the compression springs 30 directly or indirectly. Further, it is selected that the ring member 40 contacts at the inner circumferential side thereof the radially outer peripheries of the compression springs at all times or only at the time when the compression springs 30 are subjected to a centrifugal force larger than a predetermined value and bent radially outward.

In this embodiment, the ring member 40 has at predetermined positions on the inner circumferential side thereof projections 41 which are capable of contacting the radially outer peripheries of the compression springs 30.

The projections 41 in this embodiment are independent parts formed separately from a body of the ring member 40 and secured to same. The projections 41 have a lower coefficient of friction than the body of the ring member 40 and such an outer configuration shown in FIGS. 3A and 3B, i.e., an arcuated, nearly rectangular shape as a whole. Each projection 41 has a groove 42 having an open end at the radially outer side thereof. The projections 41 are attached to predetermined inner circumferential side portions of the ring member 40 by fittingly receiving the inner circumferential side portions in the grooves 42.

Preferably, the projections 41 are attached to the ring member 40 so as not to move circumferentially relative to the ring member 40. Specifically, the projections 41 are joined to the ring member 40 by using adhesive or otherwise joining materials or by using connecting pins.

In this embodiment, the projections 41 are constructed so as to contact the radially outer peripheries of the compression springs 30 at all times. However, the projections 41 can be constructed so as not to contact the compression springs 30 at all times but only when the compression springs 30 are subjected to a centrifugal force larger than a predetermined vlaue and bent radially outward.

A friction damper 45 is provided so as to apply a damping resistance to relative rotation between the first inertia member 2 and the second inertia member 5. The friction damper 45 includes a friction plate 46 for generating a frictional force at the time of relative rotation of the first inertia member 2 and the second inertia member 5, and a spring member (belleville spring) 47 for urging the friction plate 46 in a predetermined direction.

The friction plate 46 consists of an annular hub 48 and a pair of friction elements 49 attached to the opposite sides of the hub 48, and is disposed within the annular groove 9. The hub 48 of the friction plate 46 is in the form of an annular plate and has at the inner circumference thereof projections 50 engaged in the grooves 19 of the second inertia member 5. Accordingly, the friction plate 46 and the second inertia member 5 are connected so as to be rotatable as an integral unit but axially movable relative to each other.

To the projections 50 of the friction plate 46 are attached damping elements 51 which are brought into contact with projections 18 of the second inertia member 5 to provide springy or resilient reaction in response to relative movement of the friction plate 46 and the second inertia member 5. In the meantime, the damping elements 51 can be bonded to circumferential side surfaces of the projections 18 or to the circumferential side surfaces of the projections 50.

The spring (belleville spring) 47 for pushing the friction plate 46 is in the form of a depressed, circular cone and disposed at the bottom of the annular groove 9 of the second inertia member 5. The spring 47 pushes the friction plate 46 together with a pushing plate 52 against the drive plate 27.

The pushing plate 52 is of a flat, annular plate and has at the outer circumference thereof a projection 53 projecting radially outward and engaged in the notch 12 of the first inertia member 2. Accordingly, the pushing plate 52 and the first inertia member 2 are connected so as to be rotatable as an integral unit but axially movable relative to each other.

In this connection, the friction plate 46 of the friction damper 45 is pushed against the drive plate 27. On the other hand, the drive plate 27 is connected to the first inertia member 2 at two kinds of joining places, i.e., by means of the projections 35 fitted in the notches 10 of the first inertia member 2 and by means of the rivets 37. As a result, the friction damper 45 provides a friction damping resistance to relative rotation of the first and second inertia members 2 and 5.

With the above described structure, the torque applied to the input shaft 1 is inputted to the first inertia member 2. From the first inertia member 2, the torque is transmitted by way of the torsional vibration damper 6 and the friction damper 45 to the second inertia member 5.

More specifically, the drive plates 27 of the torsional vibration damper 6 are connected by way of the projections 36 and the rivets 37 to the first inertia member 2. The damper hub 26 is connected by way of the internal teeth 32 to the second inertia member 5. Thus, the torque inputted to the first inertia member 2 is transmitted by way of the drive plates 27, the compression springs 30 and the damper hub 26 to the second inertia member 5.

In this instance, the compression springs 30 disposed in the windows 28 and 29 provide a high amplitude deflection and thereby a vibration absorbing action. Further, the friction damper 45 provides a damping action since the friction plate 46 is engaged with the second inertia member 5 and the pushing plate 52 is engaged with the first inertia member 21, so the friction plate 46 is caused to slide on the drive plate 27 and the pushing plate 52 while being subjected to friction.

When the torsional vibration damper assembly is operated, the radially outer peripheries of the compression springs 30 can contact the inner circumferential side of the ring member 40, i.e., the radially inner peripheries of the projections 41 provided to the inner circumferential side of the ring member 40. That is, in case the compression springs 30 are compressed and/or subjected to a centrifugal force, they are bent radially outward. When this is the case, the springs 30 are brought into contact at the radially outer peripheries thereof with the inner circumferential side (i.e., the radially inner peripheries of the projections 41) of the ring member 40 and thereby restricted in futher radially outward bending.

In this instance, the ring member 40 is subjected to a centrifugal force of itself and a centrifugal force of the compression springs 30. However, since the ring member 40 is circular and restricted in deformation, it never occurs such a case that the ring member 40 is pushed against other constituent parts of the torque transmitting assembly.

Thus, even when the compression springs 30 are subjected to a centrifugal force at the time of operation of the torque transmitting assembly, the ring member 40 capable of contacting the outer circumferential peripheries of the compression springs 30 does not cause a large hysteresis in the torsional action, i.e., the torsional vibration damping action. Accordingly, the torsional vibration damper assembly can have stable torsional characteristics, i.e., torsional vibration damping characteristics.

Further, since the ring member 40 has at the inner circumferential side thereof the projections 41 adapted to contact the radially outer peripheries of the compression springs 30, it can contact the compression springs 30 at stably constant positions, thus making it possible to attain stable torsional characteristics.

Further, since the projections 41 are of parts independent from the body of the ring member 40 and made of a material having coefficient of friction lower than the body of the ring member 40, the friction between the compression springs 30 and the projections 30 can be reduced as small as possible.

Further, since the body of the ring member 40 is sized so as not to contact the compression springs 30 under the condition where the projections 41 are put in contact with the compression springs 30, it never occur that anything other than the projections 41 contacts the compression springs 30, thus making is possible to prevent useless friction from being produced between them.

Figure 4:
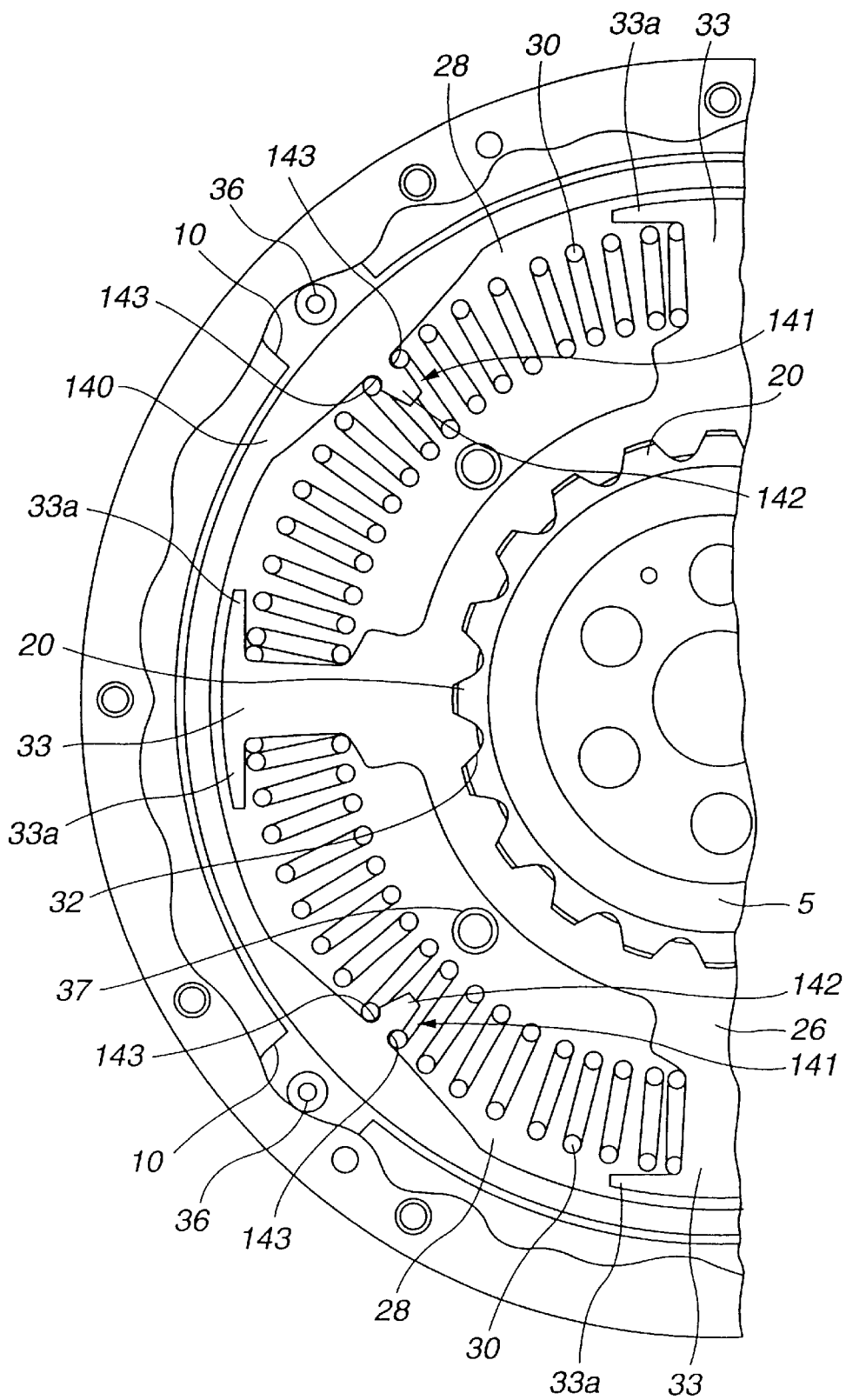
FIG. 4 is a view similar to FIG. 1 but shows another embodiment.
Figure 5:
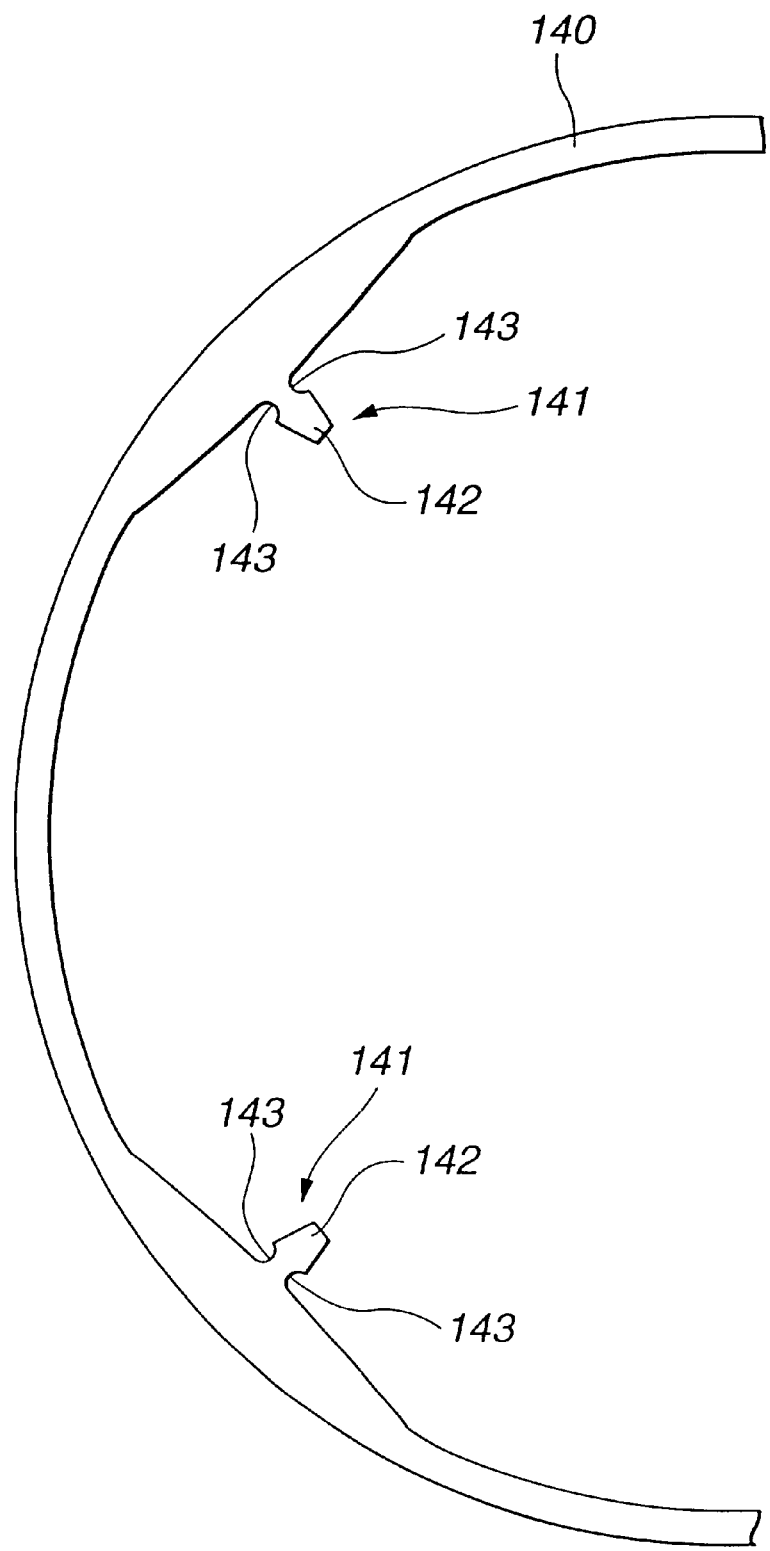
FIG. 5 is a fragmentary plan view of a ring member used in the torsional vibration damper assembly of FIG. 4.
Figure 6:
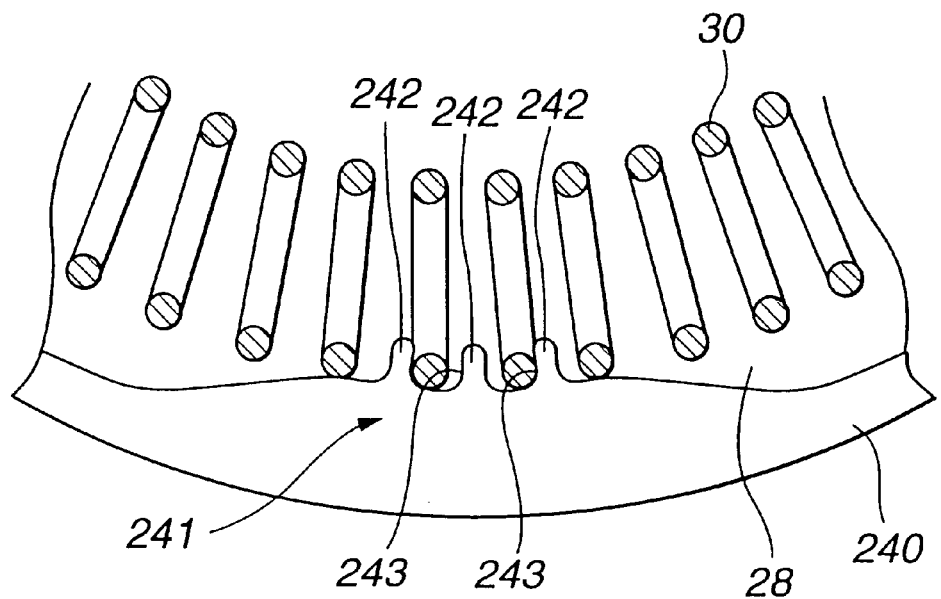
FIG. 6 is an enlarged sectional view of an important portion of a torsional vibration damper assembly according to a further embodiment of the present invention.

Referring to FIGS. 4 to 6, another embodiment will be described. This embodiment is substantially similar to the previous embodiment of FIGS. 1 to 3A–3B except for the projections 41, so like parts will be designated by like reference characters and repeated description thereto will be omitted for brevity.

In this embodiment, the projections 141 are integral with the body of the ring member 140. That is, the projections 41 are constituted by projecting portions of the body of the ring member 140, which project radially inward of the ring member 40.

In the embodiment shown in FIGS. 4 and 5, each projection 141 has a radially inner end (no numeral) capable of contacting the radially outer periphray of each of the compression springs 30. Each projection 141 further includes a finger section 142 projecvting radially inward from the above described inner end thereof. The finger section 142 is inserted between adjacent coils of each of the compression springs 30 so as to divide the compression spring 30 into two functioning segments. Each projection 141 further includes at the circumferentially opposed sides of the finger section 142 a pair of retaining sections 143 retaining predetermined portions of the compression spring 30.

Further, in the embodiment shown in FIG. 6, the ring member 240 has three finger sections 242 and two retaining sections 243, each dedifined between adjacent two of the finger section 242. The retaining sections 243 are sized so as to have the width a little larger than the diameter of the wire constituting the compression spring 30.

Figure 7:
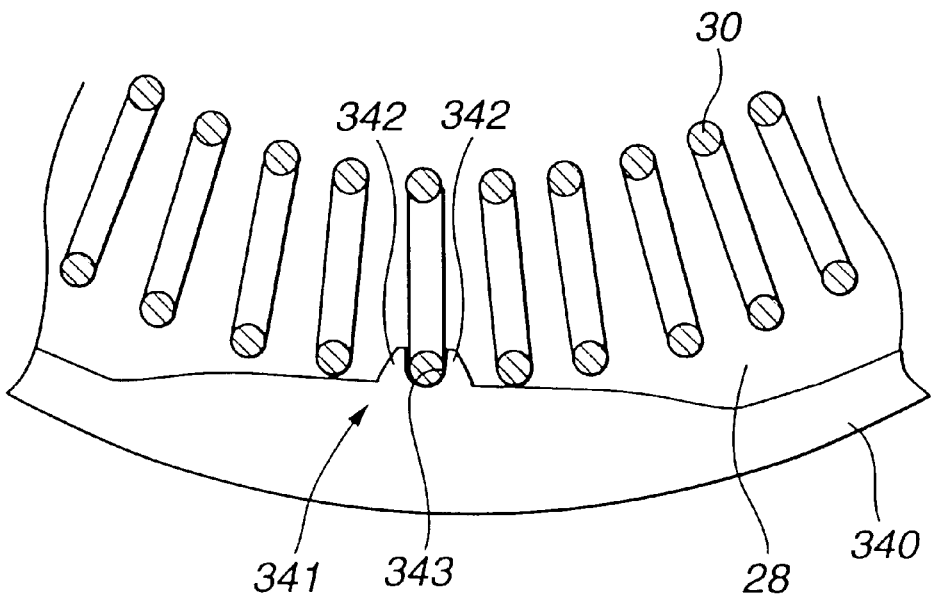
FIG. 7 is a view similar to FIG. 6 but shows a further embodiment of the present invention.

Further, in the embodiment shown in FIG. 7, the ring member 340 has two finger sections 342 and one retaining section 343 defined between the finger sections 342. The retaining section 343 has a part circular cross section which is sized and shaped so as to as to fittingly receive a predetermined portion of the compression spring 30.

With the above structures, the ring member 140, 240 or 340 is never deformed or moved by a centrifugal force applied thereto, so the ring member 140, 240 or 340 is not pushed against other constituent parts. Accordingly, it never occurs that the ring member 140, 240 or 340 causes a large hysteres in the torsional characteristics or torsional vibration damping characteristics.

Figure 2:
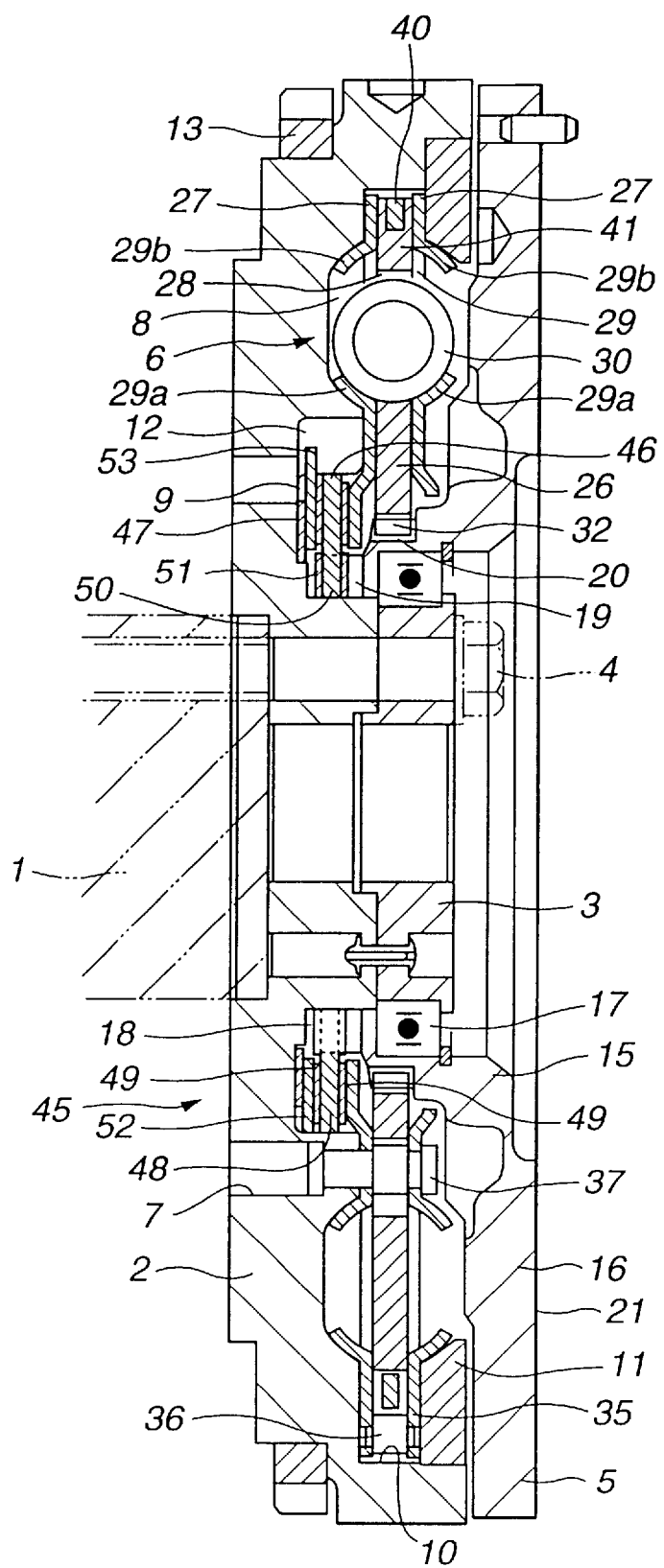
FIG. 2 is a sectional view taken along the line II—II in FIG. 1.
Figure 3A:
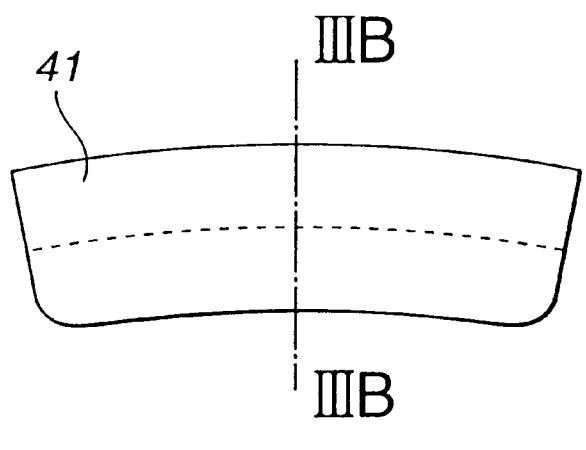
FIG. 3A is a plan view of a projection used in the torsional vibration damper assembly of FIG. 1.
Figure 3B:
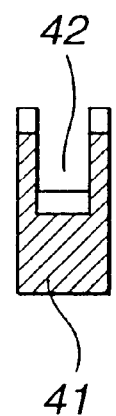
FIG. 3B is a sectional view taken along the line IIIB—IIIB in FIG. 3A.

Thus, similarly to the previous embodiment of FIGS. 1 to 3, the embodiments of FIGS. 4 to 7 can produce substantially the same effect, thus making it possible to obtain a torsional vibration damper assembly having stable torsional vibration damping characteristics.

In addition, the projections 141, 241 or 341 are integral with the body of the ring member 140, 240 or 340 and therefore can be formed with ease. Further, the embodiments are desirable since not increasing the number of constituent parts.

Further, the projections 141, 241 or 341 are provided with the retaining sections 143, 243 or 343 retaining predetermined portions of the compression springs 30, so the positions where the compression springs 30 are supported by the ring member 140, 240 or 340 become stable and stable support of the compression springs 30 can be attained.

While there have been described herein what are considered to be preferred and exemplary embodiments of the present invention, other modifications of the invention shall be apparent to those skilled in the art from the teachings herein. For example, an embodiment wherein the compression springs 30 which are arcuated or bowed have been described shown, compression springs having straight center axes can be used in place therefor.

Further, an embodiment wherein the drive plates 27 of the torsional vibration damper 6 are disposed on the opposite sides of the damper hub 26 has been described and shown, such a structure wherein a drive plate is disposed only on one side of a damper hub can be employed in place therefor.

What is claimed is:

1. A torsional vibration damper assembly comprising:
   a pair of first and second torque transmitting elements rotatable relative to each other;
   a damper hub operatively connected to said first torque transmitting element and having a plurality of circumferentially spaced radial hub arms;
   a plurality of compression springs disposed between said second torque transmitting element and said hub arms; and
   a ring member rotatable relative to said first and second torque transmitting elements, surrounding said compression springs and having an inner circumferential side capable of contacting radially outer peripheries of said compression springs.

2. A torsional vibration damper assembly according to claim 1, wherein said ring member has at said inner circumferential side a plurality of circumferentially space, radial projections projecting toward said radially outer peripheries of said compression springs.

3. A torsional vibration damper assembly according to claim 2, wherein said projections are independent from a body of said ring member.

4. A torsional vibration damper assembly according to claim 2, wherein said projections are integral with a body of said ring member.

5. A torsional vibration damper assembly according to claim 2, wherein each of said projections has a retaining section retaining a predetermined portion of each of said compression springs.

6. A torsional vibration damper assembly according to claim 2, wherein said inner circumferential side of said ring member, excluding portions where said projections are provided, is so sized as to be out of contact with said radially outer peripheries of said compression springs under the condition where said projections are put in contact with said compression springs.

7. A torsional vibration damper assembly comprising:
   a pair of first and second torque transmitting elements rotatable relative to each other;
   a damper hub operatively connected to said first torque transmitting element and having a plurality of circumferentially equally spaced radial hub arms;
   a drive plate operatively connected to said second torque transmitting element and having a plurality of circumferentially equally spaced windows;
   a plurality of compression springs extending between circumferentially opposed edges of said windows and said hub arms; and
   a ring member rotatable relative to said first and second torque transmitting elements and surrounding said compression springs for restricting radially outward bending of said compression springs.

8. A torque transmitting assembly according to claim 7, wherein said ring member has at said inner circumferential side a plurality of circumferentially spaced, radial projections, each having a radially inner end which is brought into contact with said radially outer periphery of each of said compression springs at all times.

9. A torsional vibration damper assembly according to claim 8, wherein each of said projections has a finger section projecting radially inward from said radially inner end, said finger section being inserted between adjacent coils of each of said compression springs to divide said compression springs into two segments.

10. A torsional vibration damper assembly according to claim 9, wherein each of said projections further has at circumferentially opposed sides of said finger section a pair of retaining sections retaining predetermined portions of each of said compression springs.

11. A torsional vibration damper assembly according to claim 8, wherein each of said projections has a pair of finger sections defining therebetween a retaining section retaining a predetermined portion of each of said compression springs.

12. A torsional vibration damper assembly according to claim 8, wherein said projections are independent from a body of said ring member.

13. A torsional vibration damper assembly according to claim 8, wherein said projections are integral with a body of said ring member.

14. A torsional vibration damper assembly according to claim 7, wherein said ring member has at said inner circumferential side a plurality of circumferentially spaced projections, each having a radially inner end which is brought into contact with said radially outer periphery of each of said compression springs only when said compression springs are subjected to a centrifugal force larger than a predetermined value.

15. A torsional vibration damper assembly according to claim 14, wherein each of said projecting has a finger section projecting radially inward from said radially inner end, said finger section being inserted between adjacent coils of each of said compression springs to divide said compression springs into two segments.

16. A torsional vibration damper assembly according to claim 15, wherein each of said projections further has at circumferentially opposed sides of said finger section a pair of retaining sections retaining predetermined portions of each of said compression springs.

17. A torsional vibration damper assembly according to claim 14, wherein each of said projections has a pair of finger sections defining therebetween a retaining section retaining a predetermined portion of each of said compression springs.

18. A torsional vibration damper assembly according to claim 14, wherein said projections are independent from a body of said ring member.

19. A torsional vibration damper assembly according to claim 14, wherein said projections are integral with a body of said ring member.

20. A torsional vibration damper assembly comprising:
    an input element;
    an output element;
    a damper hub operatively connected to said output element and having a plurality of circumferentially equally spaced, radial hub arms;
    a drive plate operatively connected to said input element and having a plurality of circumferentially equally spaced windows;
    a plurality of compression springs extending between circumferentially opposed edges of said windows and said hub arms; and
    a ring member rotatable relative to said input and output elements and surrounding said compression springs for restricting radially outward bending of said compression springs.

21. A torque transmitting assembly according to claim 20, wherein said ring member has at said inner circumferential side a plurality of circumferentially spaced, radial projections, each having a radially inner end which is brought into contact with said radially outer periphery of each of said compression springs at all times.

22. A torsional vibration damper assembly according to claim 21, wherein each of said projections has a finger section projecting radially inward from said circumferentially extending surface, said finger section being inserted between adjacent coils of each of said compression springs to divide said compression springs into two segments.

23. A torsional vibration damper assembly according to claim 22, wherein each of said projections further has at circumferentially opposed sides of said finger section a pair of engagement sections engaging and holding predetermined portions of said compression springs.

24. A torsional vibration damper assembly according to claim 21, wherein each of said projections has a pair of finger sections defining therebetween a retaining section retaining a predetermined portion of each of said compression springs.

25. A torsional vibration damper assembly according to claim 21, wherein said projections are independent from a body of said ring member.

26. A torsional vibration damper assembly according to claim 21, wherein said projections are integral with a body of said ring member.

* * * * *